US008102979B2

(12) United States Patent  
Desa et al.

(10) Patent No.: US 8,102,979 B2
(45) Date of Patent: Jan. 24, 2012

(54) REMOTE ACCESS TO A COMPUTER TELEPHONY SYSTEM

(75) Inventors: Hilaire Bruno Desa, Birmingham, AL (US); Gopi Krishna Yeleswarapu, Birmingham, AL (US)

(73) Assignee: Momentum Telecom, Inc., Birmingham, AL (US)

( * ) Notice: Subject to any disclaimer, the term of this patent is extended or adjusted under 35 U.S.C. 154(b) by 1322 days.

(21) Appl. No.: 11/622,222

(22) Filed: Jan. 11, 2007

(65) Prior Publication Data

US 2007/0201453 A1 Aug. 30, 2007

Related U.S. Application Data

(60) Provisional application No. 60/765,807, filed on Feb. 7, 2006.

(51) Int. Cl.
*H04M 11/00* (2006.01)

(52) U.S. Cl. ............... 379/90.01; 379/93.05; 379/93.07; 379/221.02

(58) Field of Classification Search ............... 379/90.01, 379/93.05, 221.02, 221.01, 221.08, 221.09 379/212.01; 455/445
See application file for complete search history.

(56) References Cited

U.S. PATENT DOCUMENTS

| | | | |
|---|---|---|---|
| 6,243,374 B1 | 6/2001 | White et al. | |
| 6,282,269 B1 | 8/2001 | Bowater et al. | |
| 6,625,258 B1 | 9/2003 | Ram et al. | |
| 6,636,596 B1 | 10/2003 | Gallant et al. | |
| 6,661,785 B1 | 12/2003 | Zhang et al. | |
| 6,775,264 B1 | 8/2004 | Kurganov | |
| 6,807,257 B1 | 10/2004 | Kurganov | |
| 6,842,448 B1 | 1/2005 | Norris et al. | |
| 7,649,987 B1* | 1/2010 | Contractor | 379/221.02 |
| 2001/0024491 A1* | 9/2001 | Walker et al. | 379/144.01 |
| 2003/0108176 A1 | 6/2003 | Kung et al. | |
| 2003/0163526 A1 | 8/2003 | Clarisse et al. | |
| 2003/0215077 A1 | 11/2003 | Hagiwara | |
| 2004/0062210 A1 | 4/2004 | Genter et al. | |
| 2004/0081136 A1 | 4/2004 | Brown et al. | |
| 2004/0090954 A1 | 5/2004 | Zhang et al. | |
| 2004/0109558 A1 | 6/2004 | Koch | |
| 2004/0114732 A1 | 6/2004 | Choe et al. | |
| 2004/0120478 A1 | 6/2004 | Reynolds et al. | |
| 2004/0136507 A1 | 7/2004 | Reynolds | |
| 2004/0162747 A1 | 8/2004 | Yeh et al. | |
| 2004/0223464 A1 | 11/2004 | Dye et al. | |
| 2004/0223598 A1 | 11/2004 | Spiridellis | |
| 2004/0258054 A1 | 12/2004 | Kurganov | |
| 2004/0258055 A1 | 12/2004 | Kurganov | |
| 2005/0008004 A1 | 1/2005 | Williams | |
| 2005/0031109 A1 | 2/2005 | Fernandez et al. | |
| 2005/0036592 A1 | 2/2005 | Holt et al. | |
| 2005/0068936 A1 | 3/2005 | Keskiniva et al. | |
| 2005/0078806 A1 | 4/2005 | Reynolds | |
| 2005/0135592 A1 | 6/2005 | Caspi et al. | |
| 2005/0157704 A1 | 7/2005 | Lim | |

(Continued)

*Primary Examiner* — Melur Ramakrishnaiah
(74) *Attorney, Agent, or Firm* — Squire, Sanders & Dempsey, (US) LLP (57) ABSTRACT

A method of accessing a plurality of features of a second telecommunication system from a first telecommunication system includes receiving a telephone call on the second telecommunication system from a first device having a first telephone number and determining whether the first telephone number is a stored authorized number. The method further includes determining if the first telephone number is a stored authorized number, and providing access to the plurality of features if it is.

14 Claims, 5 Drawing Sheets

U.S. PATENT DOCUMENTS

| | | |
|---|---|---|
| 2005/0163289 A1 | 7/2005 | Caspi et al. |
| 2005/0195948 A1 | 9/2005 | Reynolds |
| 2005/0276395 A1 * | 12/2005 | Schultz et al. ............. 379/88.19 |
| 2006/0229098 A1 * | 10/2006 | LaBauve et al. ........... 455/552.1 |

* cited by examiner

REMOTE ACCESS TO A COMPUTER TELEPHONY SYSTEM

RELATED APPLICATIONS

This application claims the benefit of U.S. Provisional Patent Application No. 60/765,807, filed Feb. 7, 2006, the specification of which is herein incorporated by reference.

FIELD OF THE INVENTION

One embodiment of the present invention is directed to computer telephony. More particularly, one embodiment of the present invention is directed to remote access of telecommunication services through a computer telephony system.

BACKGROUND INFORMATION

Voice over Internet protocol ("VoIP") telephone services and related systems are known. Such systems allow voice calls using Internet Protocol ("IP") networks such as the Internet as an alternative to traditional public switched telephone networks ("PSTN"). Unlike the PSTN, which is circuit-switched, the Internet is packet-switched. As such, communications on the Internet is accomplished by transmitting and receiving packets of data. In addition to data, each packet contains a destination address to ensure that it is routed correctly. The format of these packets is defined by the IP.

One type of allowable data is encoded, digitized voice, termed VoIP. VoIP is voice that is packetized as defined by the Internet protocol, and communicated over the Internet for telephone-like communication. Individual VoIP packets may travel over different network paths to reach a final destination where the packets are reassembled in correct sequence to reconstruct the voice information.

Many VoIP systems allow a user to access advanced telephony features that are typically not available over the PSTN. Some of these features are available because VoIP is integrated with a computer telephony system that provides access to content on the Internet. U.S. patent application Ser. No. 11/289,435, entitled "Speech Recognition Based Computer Telephony System", filed on Nov. 30, 2005, discloses examples of some advanced telephony features that may be available on a VoIP system.

However, in order to obtain advanced telephony features, a user must typically subscribe to multiple telephony services. For example, mobility requires cellular services, while low cost international rates and digital features typically require VoIP services, which in turn frequently require a Digital Subscriber Line ("DSL") or cable broadband that is provided over fixed land lines. The user cannot combine the best features of these individual services into one single service that can be accessed from any location. Further, users of fixed land line telephony services such as the PSTN or VoIP over cable or DSL Broadband can only access their service from a single prescribed location. Thus, subscribers of one phone/telephony service cannot transfer the access point of that service from a fixed location to another location of their choice and therefore do not have the ability to share their service with others.

Based on the foregoing, there is a need for a system and method for providing remote access to a computer telephony system.

SUMMARY OF THE INVENTION

One embodiment of the present invention is a method of accessing a plurality of features of a second telecommunication system from a first telecommunication system. The method includes receiving a telephone call on the second telecommunication system from a first device having a first telephone number and determining whether the first telephone number is a stored authorized number. The method further includes determining if the first telephone number is a stored authorized number, and providing access to the plurality of features if it is.

DETAILED DESCRIPTION

One embodiment of the present invention allows a subscriber to create a virtual telephone service and therefore to be able to access features and services on one phone/telephony service such as a VoIP network via another phone/telephony service such as a cellular network. This allows the user to access all subscribed services at a location of their convenience.

Figure 1:
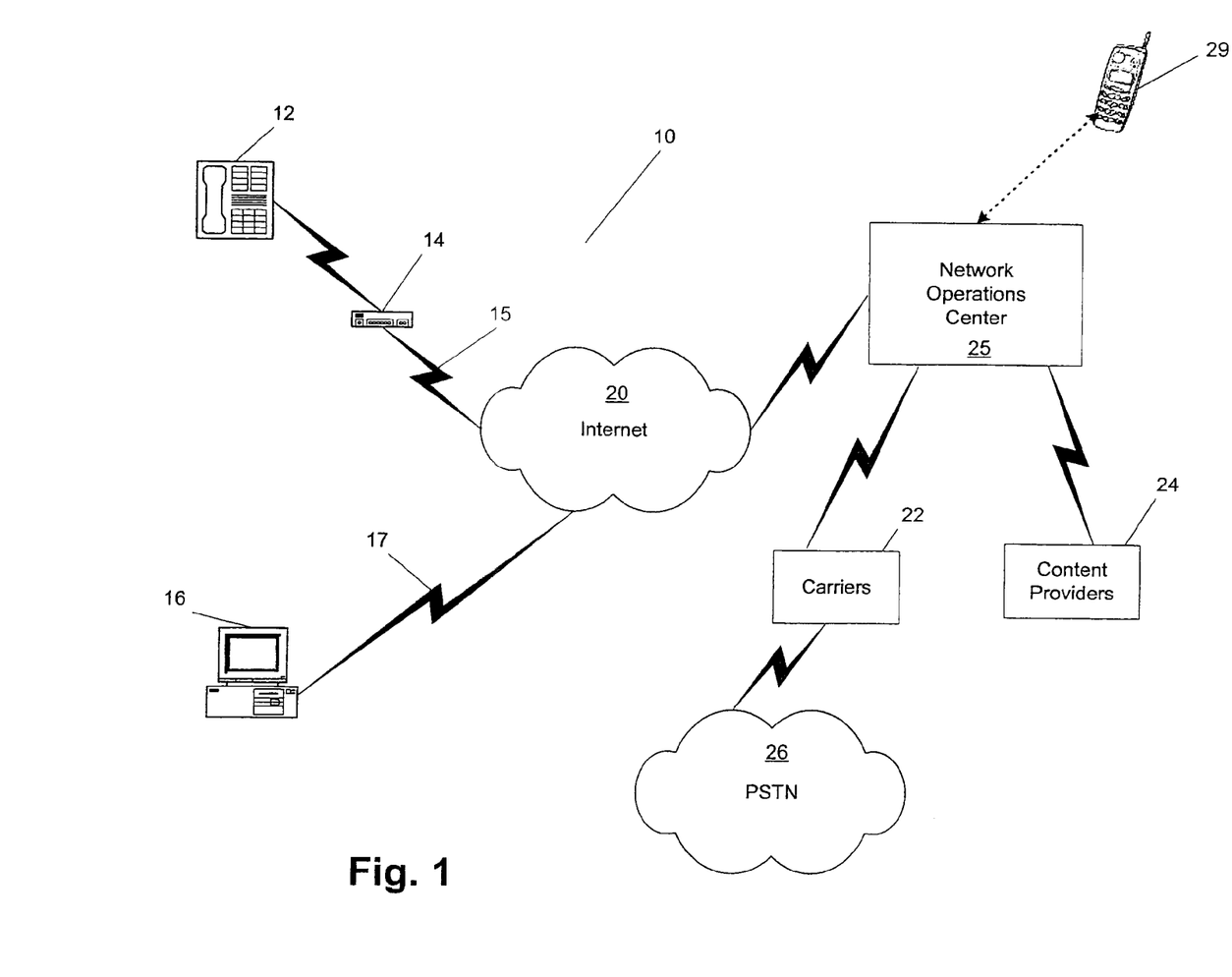
FIG. 1 is a block diagram of a VoIP computer telephony telecommunication system that can implement an embodiment of the present invention.

FIG. 1 is a block diagram of a VoIP computer telephony telecommunication system 10 that can implement an embodiment of the present invention.

A user interacts with telecommunication system 10 through either a telephone 12 or a computer 16. Telephone 12 can be any plain old telephone system ("POTS"). In one embodiment, telephone 12 is coupled to an analog telephone adapter ("ATA") 14, which functions as a handset-to-Ethernet adaptor that turns traditional telephone devices into IP devices. ATA 14 allows telephone 12 to be coupled to the Internet 20 over a broadband IP connection 15. In one embodiment, ATA 14 is the SPA-3000 Analog Telephone Adapter from Sipura Technology Inc.

Computer 16 can be any general purpose computer or any other type of device that executes a browser and that connects to the Internet 20 through a link 17. A subscriber of system 10 interfaces with computer 16 in order to set up functionality of the system, as disclosed below. Computer 16 can be also used as a telephone to provide telecommunication services.

A user at telephone 12 or computer 16 is ultimately coupled to a network operations center 25 through the Internet 20. As discussed below, the user at telephone 12 is automatically coupled to a speech recognizer in network operations center 25 as soon as telephone 12 goes "off-hook".

Embodiments of the present invention are not limited to accessing network operations center 25 through only a POTS or computer. For example, network operations center 25 may also be accessed through a POTS over the PSTN 26 by dialing a number associated with network operations center 25, via a cellular telephone, or by any other known method.

Network operations center 25 is coupled to various telephone carriers 22 for coupling telephone 12 to another POTS over the PSTN. Further, network operations center 25 is coupled to one or more content providers 24 for providing content to a user at telephone 12. The content may be stored locally to content providers 24, or may be accessed from the Internet 20 of from some other source.

A subscriber to system 10 will be assigned a home telephone number associated with telephone 12. This enables non-subscribers to reach telephone 12 through the PSTN or any other system by dialing the telephone number. For example, a user at a cellular telephone 29 (which is not considered part of system 10 and in one embodiment is on a separate cellular telephone network) who desires to talk to a user at telephone 12 will dial the telephone number associated with telephone 12. Unbeknownst to the user at telephone 29, the call will first be routed to networks operations center 25, which will then route the call to telephone 12. Cellular telephone 29 can be any type of telephone that is associated with a telephone number.

Figure 2:
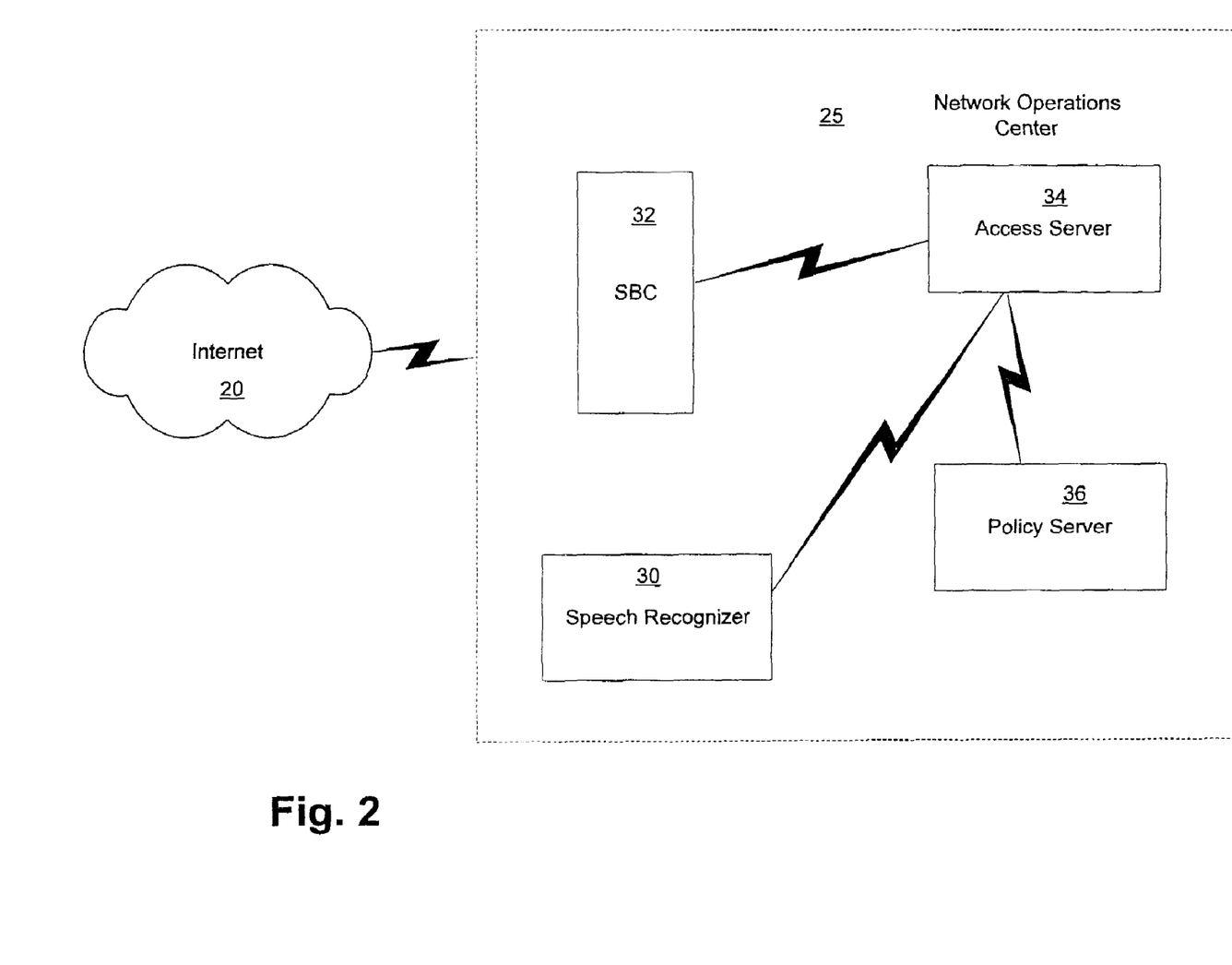
FIG. 2 is a block diagram of a network operations center that is coupled to the Internet.

FIG. 2 is a block diagram of network operations center 25 that is coupled to Internet 20. Network operations center 25 includes a sessions border controller ("SBC") 32. SBC 32 controls real-time interactive communications—voice, video, and multimedia sessions—across IP network borders. It provides new session controls in the areas of security, service reach and interworking, SLA assurance, revenue/profit assurance, and regulatory compliance.

Coupled to SBC 32 is an access server 34. Access server 34 includes a media gateway that converts traditional phone circuits such as PRIs or T-1s, enabling VoIP networks to connect to traditional phone networks. Access server 34 further implements customer features such as Caller ID, Call Waiting, and Speed Dialing. In one embodiment, access server 34 is the GSX and ASX controller from Sonus Corp. Access server 34 includes a memory device for storing data.

Coupled to access server 34 is a policy server 36. Policy server 36 makes logical decisions determining which of the carriers 22 to route each call. These decisions can be based on cost, priority, or a combination of the two. In one embodiment, policy server 36 is the PSX controller from Sonus Corp.

Network operations center 25 further includes a speech recognizer 30 which is a speech recognition system that recognizes spoken words and further performs text-to-speech generation, and includes a navigational menu. In one embodiment, speech recognizer 30 is a speech recognition system from Nuance Communications, Inc.

In one embodiment of the present invention, when a user takes telephone 12 off-hook, the user is automatically routed to the speech recognizer 30 of network operations center 25. The user will be routed to network operations center 25 without any interaction by the user, such as a spoken word or Dual Tone Multi-Frequency ("DTMF") input. Further, unlike known telephony systems where a user, upon taking a telephone off-hook, will hear a traditional audio "dial-tone", in embodiments of the present invention, the user, upon taking telephone 12 off-hook, will instead hear a musical selection generated by the navigational menu of speech recognizer 12, and then a menu describing the telecommunication services available to the user. The services can be then selected by the user through spoken word or DTMF selection.

Figure 3:
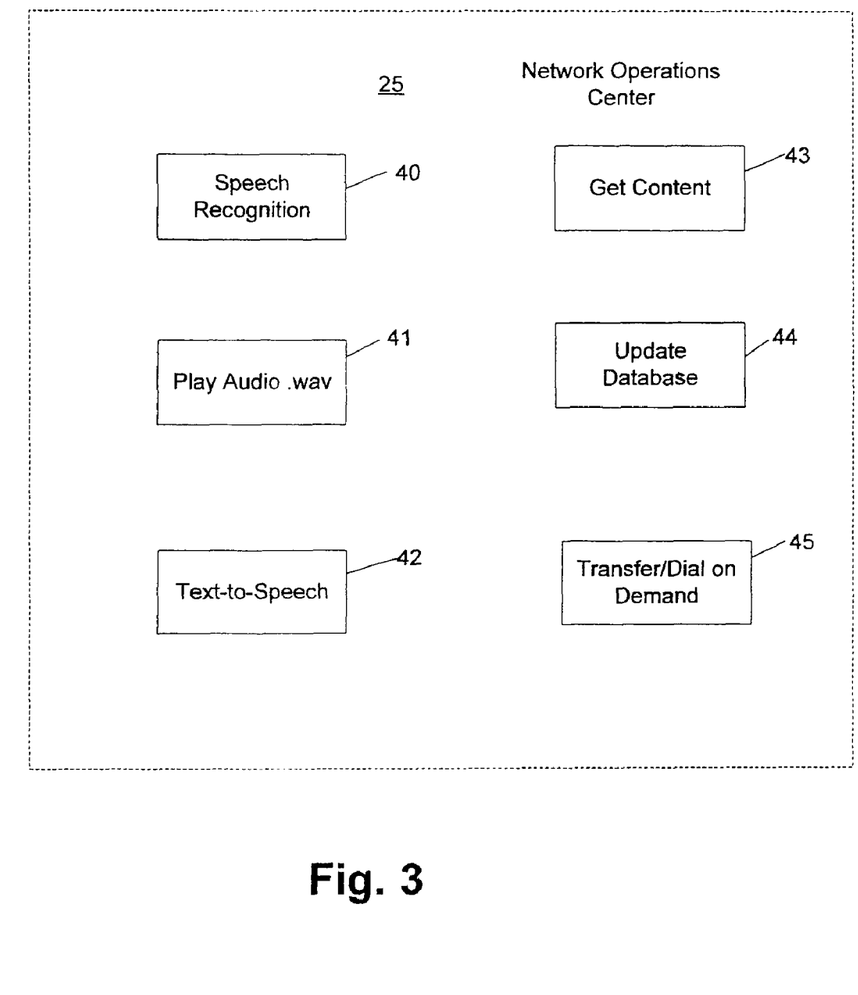
FIG. 3 is a block diagram of the network operations center in accordance with one embodiment of the present invention and illustrates some of the modules of functionality that is provided to a user of a telephone.

FIG. 3 is a block diagram of network operations center 25 in accordance with one embodiment of the present invention and illustrates some of the modules of functionality that is provided to a user of telephone 12. In one embodiment, the functionality is implemented by software stored in a memory and executed by a processor. In one embodiment, the software functionality is implemented using a Voice Extensible Markup Language ("VXML") interpreter. In other embodiments, the functionality can be performed by hardware, or any combination of hardware and software.

Speech recognition module 40 allows the user to interact with network operations center 25 by listening to audio that is either pre-recorded or computer-synthesized and submitting audio input through the user's natural speaking voice or through a keypad on telephone 12.

Play audio module 41 plays the audio to the user at telephone 12 when the telephone goes off-hook. The audio may be in the form of a .wav file and may be musical. As disclosed, the audio takes the place of a traditional dial tone that a user of a telephone will initially hear in prior art telephony systems.

Text-to-speech module 42 performs a form of speech synthesis that converts text into spoken voice output that can be heard by a user of telephone 12. In one embodiment, the text is content such as weather, horoscope, etc. that is requested by the user.

Get content module 43 retrieves content that is requested by the user through speech recognition module 40. The content could be retrieved from local cache storage or retrieved real time from the Internet 20 or other source.

Update database module 44 allows a user at computer 16, through web pages, to update personal selections for that user's profile.

Transfer/dial-on-demand module 45 will couple the user at telephone 12 to another telephone over the PSTN or other network based on a request from the user.

Additional functionality of network operations center 25 and the interfaces presented to a user at computer 16 is disclosed in more detail in U.S. patent application Ser. No. 11/289,435, entitled "Speech Recognition Based Computer Telephony System", filed on Nov. 30, 2005, the disclosure of which is hereby incorporated by reference.

Figure 4:
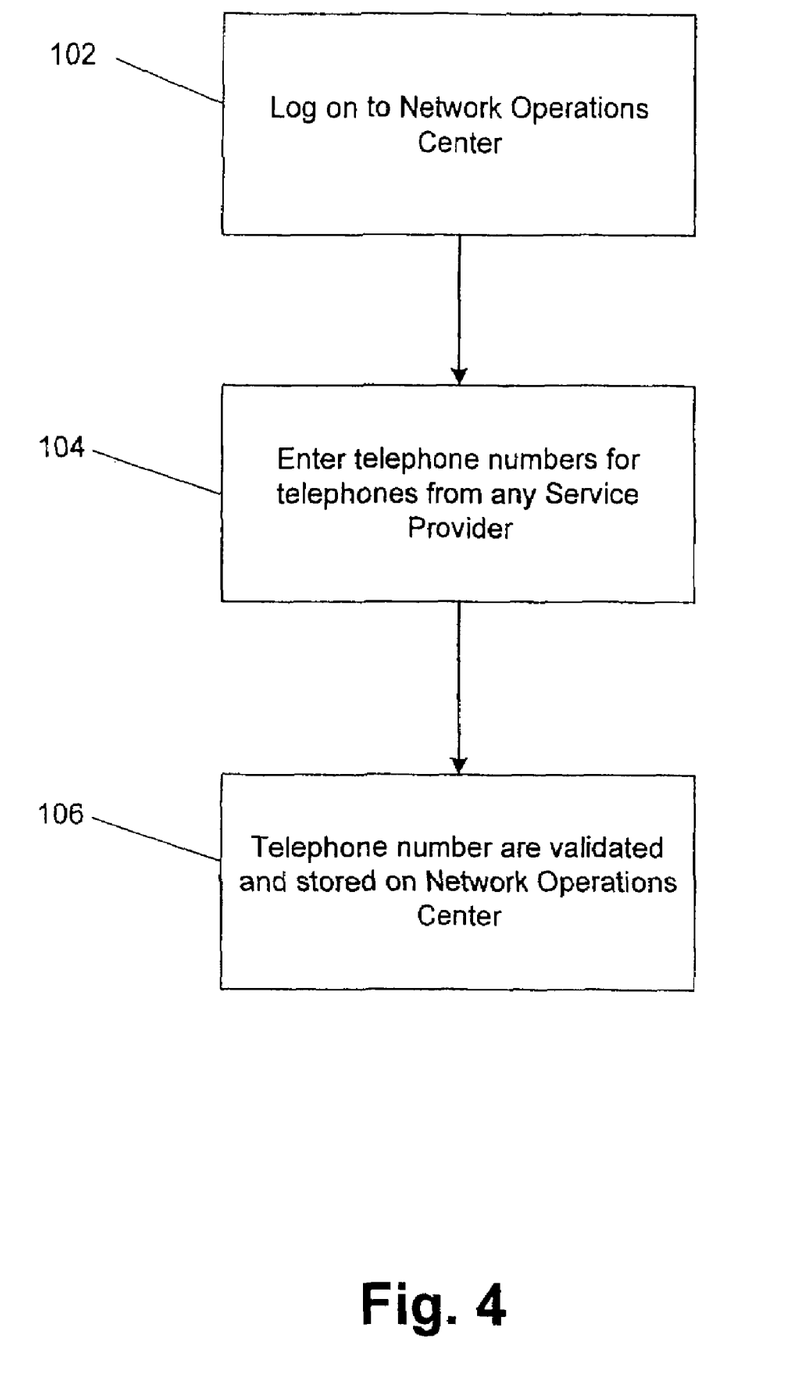
FIG. 4 is a flow diagram of the functionality performed by the network operations center in accordance with one embodiment of the present invention when a subscriber to the system registers devices that are not part of the system.

In one embodiment, a user at cellular telephone 29 and other devices which are not part of VoIP computer telephony system 10 can utilize some or all of the advance features provided by the VoIP computer telephony system 10. A subscriber to VoIP computer telephony system 10 first registers the other devices. FIG. 4 is a flow diagram of the functionality performed by network operations center 25 in accordance with one embodiment of the present invention when a subscriber to system 10 registers devices that are not part of system 10.

102: A subscriber to system 10 logs on to network operations center 25 from computer 16 through Internet 20, or using any other method. All subscribers to system 10 in one embodiment have logon identifications and passwords.

104: The subscriber enter telephone numbers associated with any telephones or other devices that the subscriber wants to allow to use VoIP computer telephony system 10. The registered devices can be part of system 10, or can be part of any other service provider as long as they are identified by a telephone number or other means. The registered devices can be cellular telephones, PSTN telephones, VoIP telephones, public pay telephones, etc. The registered devices may be owned by the subscriber, or may be owned by a third party who the subscriber wants to be allowed to use the features of system 10.

106: The telephone numbers are validated by network operations center 25 (i.e., verified that they are legitimate numbers) and stored so that they are accessible to network operations center 25. In one embodiment, the telephone numbers are stored on access server 34.

Figure 5:
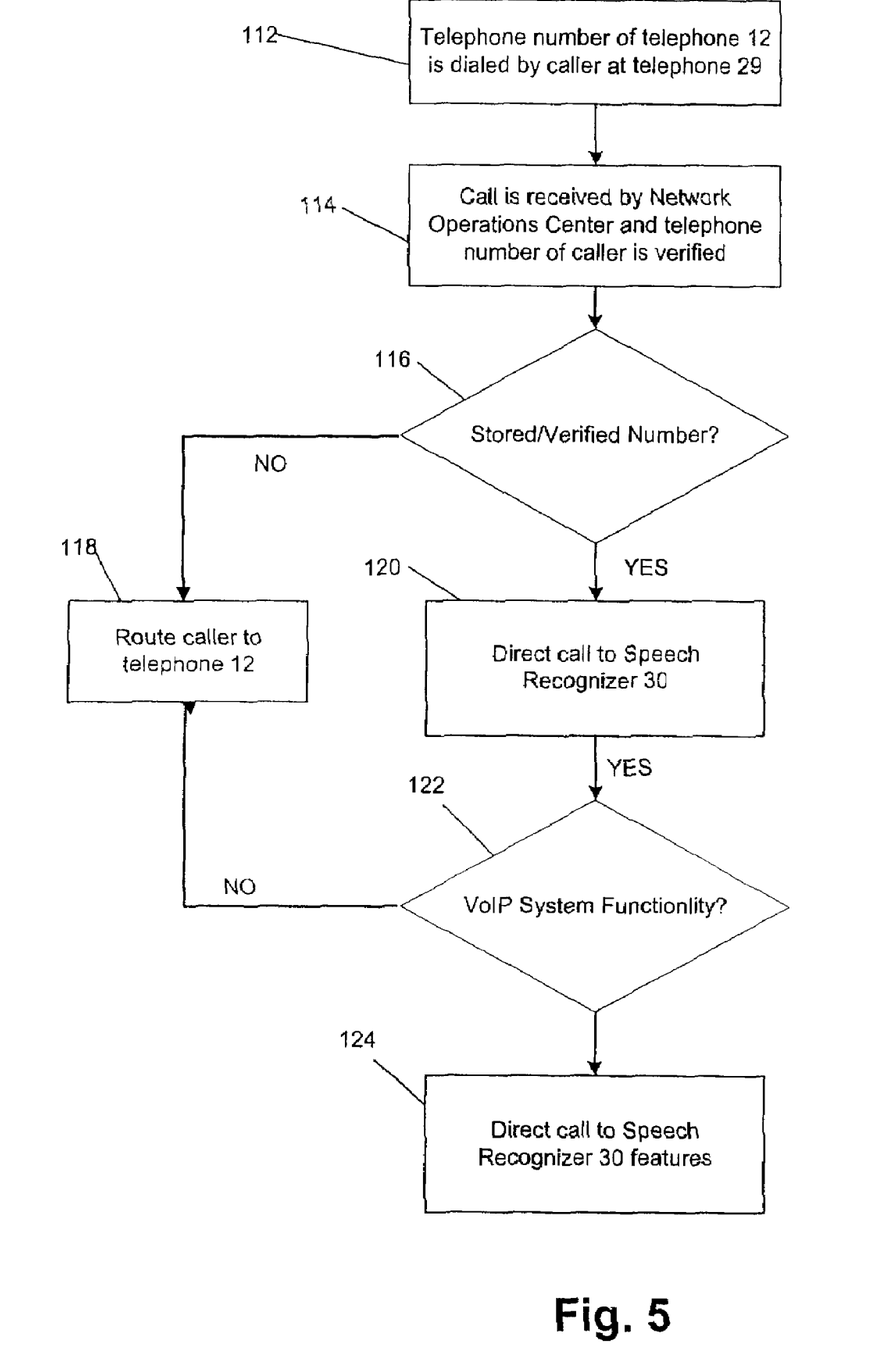
FIG. 5 is a flow diagram of the functionality performed by the network operations center in accordance with one embodiment of the present invention when a caller attempts to call a subscriber having the telephone number associated with a telephone.

FIG. 5 is a flow diagram of the functionality performed by network operations center 25 in accordance with one embodiment of the present invention when a caller at telephone 29 dials the telephone number associated with telephone 12 of system 10 (i.e., attempts to call a subscriber having the telephone number associated with telephone 12 or any other telephone that is part of system 10).

112: The telephone number associated with telephone 12 is dialed by the caller at telephone 29. In one embodiment, the telephone number associated with telephone 12 is the "home" telephone number of the user of telephone 12.

114: The call is automatically routed to network operations center 25 and the telephone number of the caller is verified by determining if it is one of the authorized and validated telephone numbers stored at 106 of FIG. 4.

116: If it is determined that the telephone number is not a stored/verified number, functionality goes to 118 where the call is automatically routed to telephone 12. If it is determined that the telephone number is a stored/verified number, functionality is routed to 120.

120: Telephone 29 is coupled to speech recognizer 30 and the caller is given the option to be connected to telephone 12, or to be "remote" and be able to use the VoIP functionality offered by network operations center 25. In one embodiment, speech recognizer 30 will wait for a fixed time period (e.g., 10 seconds) and listen for the user to say a pre-assigned word, such as "remote". If speech recognizer hears the word, it means that the user desires to use the functionality of system 10. Otherwise, it is assumed that the user wants to be connected to telephone 12, which corresponds to telephone number dialed by the user at telephone 29. In other embodiments, speech recognizer will present the user with an audio choice (e.g., remote or dial telephone), or will use other means to determine whether the user desires to be connected to telephone 12 or to utilize the functionality of system 10.

122: If it is determined that the user at telephone 29 desires to be connected to telephone 12, functionality goes to 118 where the call is automatically routed to telephone 12. If it is determined that the user desires to utilize the functionality of system 10, functionality is routed to 124.

124: The call is directed to the features offered by network operations center 25 via speech recognizer 30 (e.g., the features shown in FIG. 3). At this point, the user at telephone 29 can use some or all of the features of system 10 and can access the features using known methods, including the methods disclosed in U.S. patent application Ser. No. 11/289,435. Therefore, a user a telephone 29 which is not part of VoIP computer telephony system 10 can nonetheless use the many advanced features offered by VoIP computer telephony system.

As disclosed, embodiments of the present invention allow a subscriber to access the features and services of their VoIP phone/telephony using their cell phone and as a result can dramatically lower the cost of international telephone calls as well as access other VoIP features such as retrieving Internet content. Further, subscribers of one phone/telephony system can freely change their geographic location to access their service and thus will be able to share the services of their phone/telephony services with others. In this manner, a subscriber with only access to a narrow band POTS telephone can access and utilize the full features of a broadband VoIP service.

The subscriber of the called phone/telephony service can pre-authorize only certain phone/telephony numbers or telephony services to access their services or they could choose not to have pre-authorization. The subscriber of the calling phone/telephony service must call from a pre-authorized phone if the subscriber of the called phone/telephony service requires them to. Otherwise they can call from any phone/telephony system.

Once the subscriber of the calling phone/telephony service is connected to the called phone/telephony service they can use the features on the called phone/telephony service. In this manner VoIP services are available over standard cell phones or other devices and dramatically lower rates for international calling is achieved, as well as access to other VoIP features.

Several embodiments of the present invention are specifically illustrated and/or described herein. However, it will be appreciated that modifications and variations of the present invention are covered by the above teachings and within the purview of the appended claims without departing from the spirit and intended scope of the invention.

What is claimed is:

1. A method of accessing a plurality of features of a second telecommunication system from a first telecommunication system comprising:

receiving a telephone call from a first calling party on the second telecommunication system from a first device having a first telephone number, wherein the second telecommunication system is a Voice over Internet protocol (VoIP) computer telephony system;

determining whether the first telephone number is a stored authorized number in the VoIP system; and if the first telephone number is the stored authorized number, providing access to the plurality of features;

wherein the telephone call is initiated by dialing a subscriber telephone number corresponding to a subscriber device that is assigned to a subscriber to the VoIP system and can be dialed by a calling party over a public switched telephone network (PSTN);

wherein when the first telephone number is not a stored authorized number, routing the telephone call to the subscriber device;

wherein the providing access comprises waiting a fixed period of time for the first calling party to say a pre-assigned word or enter a pre-defined data to have access to the plurality of features, and if the fixed period of time expires without the calling party saving the pre-assigned word or entering the pre-defined data, automatically routing the telephone call to the subscriber device.

2. The method of claim 1, wherein the first telecommunication system is a cellular telephone system.

3. The method of claim 1, wherein the first telecommunication system is a Voice over Internet protocol computer telephony system.

4. The method of claim 1, wherein the first telecommunication system is a public switched telephone network.

5. The method of claim 1, wherein the plurality of features comprise accessing content from the Internet.

6. The method of claim 1, wherein the plurality of features comprise transferring the call to a second telephone number.

7. The method of claim 1, further comprising: if the first telephone number is not the stored authorized number, coupling the first device to a second device associated with a second telephone number dialed by the first device.

8. The method of claim 1, wherein providing access to the plurality of features comprises coupling the first device to a speech recognition system.

9. A computer readable medium having instructions stored thereon that, when executed by a processor, causes the processor to access a plurality of features of a second telecommunication system from a first telecommunication system by:

receiving a telephone call from a first calling party on the second telecommunication system from a first device having a first telephone number, wherein the second telecommunication system is a Voice over Internet protocol (VoIP) computer telephony system;

determining whether the first telephone number is a stored authorized number in the VoIP system; and if the first telephone number is the stored authorized number, providing access to the plurality of features;

wherein the telephone call is initiated by dialing a subscriber telephone number corresponding to a subscriber device that is assigned to a subscriber to the VoIP system and can be dialed by a calling party over a public switched telephone network (PSTN);

wherein when the first telephone number is not a stored authorized number, routing the telephone call to the subscriber device;

wherein the providing access comprises waiting a fixed period of time for the first calling party to say a pre-assigned word or enter a pre-defined data to have access to the plurality of features, and if the fixed period of time expires without the calling party saying the pre-assigned word or entering the pre-defined data, automatically routing the telephone call to the subscriber device.

10. The computer readable medium of claim 9, wherein the plurality of features comprise accessing content from the Internet.

11. The computer readable medium of claim 9, wherein the plurality of features comprise transferring the call to a second telephone number.

12. The computer readable medium of claim 9, said instructions further causing said processor to: if the first telephone number is not the stored authorized number, coupling the first device to a second device associated with a second telephone number dialed by the first device.

13. The computer readable medium of claim 9, wherein providing access to the plurality of features comprises coupling the first device to a speech recognition system.

14. A system for accessing a plurality of features of a second telecommunication system from a first telecommunication system comprising:

means for receiving a telephone call from a first calling party on the second telecommunication system from a first device having a first telephone number, wherein the second telecommunication system is a Voice over Internet protocol (VoIP) computer telephony system;

means for determining whether the first telephone number is a stored authorized number in the VoIP system; and if the first telephone number is the stored authorized number, means for providing access to the plurality of features;

wherein the telephone call is initiated by dialing a subscriber telephone number corresponding to a subscriber device that is assigned to a subscriber to the VoIP system and can be dialed by a calling party over a public switched telephone network (PSTN);

wherein when the first telephone number is not a stored authorized number, routing the telephone call to the subscriber device;

wherein the providing access comprises waiting a fixed period of time for the first calling party to say a pre-assigned word or enter a pre-defined data to have access to the plurality of features, and if the fixed period of time expires without the calling party saying the pre-assigned word or entering the pre-defined data, automatically routing the telephone call to the subscriber device.

* * * * *